United States Patent
Schwindt

(10) Patent No.: US 9,074,536 B2
(45) Date of Patent: Jul. 7, 2015

(54) ACC REACTION TO TARGET OBJECT TURN OFFS

(71) Applicant: Robert Bosch GmbH, Stuttgart (DE)

(72) Inventor: Oliver F. Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/834,907

(22) Filed: Mar. 15, 2013

(65) Prior Publication Data

US 2014/0100756 A1    Apr. 10, 2014

Related U.S. Application Data

(60) Provisional application No. 61/709,629, filed on Oct. 4, 2012.

(51) Int. Cl.
| | |
|---|---|
| *B60T 7/12* | (2006.01) |
| *F02D 28/00* | (2006.01) |
| *B60W 30/16* | (2012.01) |
| *B60W 30/18* | (2012.01) |

(52) U.S. Cl.
CPC ............ *F02D 28/00* (2013.01); *B60W 30/16* (2013.01); *B60W 30/18145* (2013.01); *B60W 30/18154* (2013.01); *B60W 2540/18* (2013.01); *B60W 2550/308* (2013.01); *B60W 2720/106* (2013.01); *B60W 2750/308* (2013.01)

(58) Field of Classification Search
CPC ............ B60K 31/0008; B60W 30/16; B60W 2720/106
USPC .......... 701/93–96, 36, 70, 301, 117; 702/142, 702/145, 150; 340/436, 901
See application file for complete search history.

(56) References Cited

U.S. PATENT DOCUMENTS

| | | | | |
|---|---|---|---|---|
| 5,871,062 | A | * 2/1999 | Desens et al. | 180/169 |
| 6,826,479 | B2 | * 11/2004 | Miyahara | 701/301 |
| 7,124,027 | B1 | 10/2006 | Ernst, Jr. et al. | |

(Continued)

FOREIGN PATENT DOCUMENTS

| | | |
|---|---|---|
| DE | 10349433 | 6/2004 |
| DE | 102004047178 | 3/2006 |

(Continued)

OTHER PUBLICATIONS

International Search Report and Written Opinion for Application No. PCT/US2013/063366 dated Jan. 3, 2014 (13 pages).

*Primary Examiner* — Helal A Algahaim
*Assistant Examiner* — Shardul Patel
(74) *Attorney, Agent, or Firm* — Michael Best & Friedrich LLP

(57) ABSTRACT

An adaptive cruise control (ACC) system for a vehicle. The ACC includes a vehicle speed sensor, a user interface, a steering angle sensor, a forward facing sensor, and an engine control unit (ECU). The vehicle speed sensor is configured to detect a speed of the vehicle and output an indication of the detected speed. The steering angle sensor is configured to provide an indication of the direction a driver is steering the vehicle. The forward facing sensor is configured to detect objects in front of the vehicle and to provide an indication of the objects. The ECU includes an adaptive cruise control (ACC) and is configured to receive the indications from the sensors, and to determine whether to continue following a target vehicle or to release the target vehicle and accelerate the vehicle to a cruising speed.

12 Claims, 4 Drawing Sheets

(56) References Cited

U.S. PATENT DOCUMENTS

| | | |
|---|---|---|
| 7,257,478 B2 * | 8/2007 | Sugano .......................... 701/96 |
| 7,337,056 B2 * | 2/2008 | Arai ............................... 701/96 |
| 8,131,444 B2 * | 3/2012 | Urban et al. ................... 701/96 |
| 2009/0132142 A1 * | 5/2009 | Nowak et al. .................. 701/93 |
| 2009/0164109 A1 | 6/2009 | Maruyama |
| 2009/0248270 A1 | 10/2009 | Sekiguchi |
| 2010/0023245 A1 * | 1/2010 | Huang et al. ................. 701/117 |
| 2010/0324797 A1 | 12/2010 | Fritz |
| 2012/0179350 A1 * | 7/2012 | Taneyhill et al. ............... 701/96 |
| 2012/0209492 A1 * | 8/2012 | Choi ............................... 701/96 |
| 2012/0239269 A1 | 9/2012 | Bonne |
| 2013/0151058 A1 * | 6/2013 | Zagorski et al. ................ 701/23 |

FOREIGN PATENT DOCUMENTS

| | | |
|---|---|---|
| DE | 102004047081 | 4/2006 |
| DE | 102008010667 | 8/2008 |
| EP | 0890470 | 1/1999 |

* cited by examiner

ACC REACTION TO TARGET OBJECT TURN OFFS

RELATED APPLICATION

The present patent application claims the benefit of prior filed U.S. Provisional Patent Application No. 61/709,629, filed on Oct. 4, 2012, the entire content of which is hereby incorporated by reference.

BACKGROUND

Embodiments of the invention relate to adaptive cruise control (ACC). More specifically, embodiments of the invention relate to removing a braking request when a target vehicle being tracked by the ACC turns off of the road.

As is known, many ACC systems track a target vehicle located in front of the ACC-equipped vehicle. The tracking is discontinued when certain conditions occur. Discontinuing tracking of the target vehicle is sometimes referred to as "releasing" or "letting go of" the target vehicle. Many ACC systems brake too long when target object has turned off onto a side road. Such a turn by the target object is often preceded by a braking event, such that the ACC vehicle is in the process of braking when this turn-off occurs. This is commonly referred to as a "McDonalds turn."

The problem is caused because the ACC "lets go of" or releases the target object too late, and braking is ramped down too slowly. The release of the target object late is tuned so that a course-prediction decision on whether to follow the object, or to continue to drive straight-ahead is postponed. The slow brake ramp-out is used to prevent making an incorrect course prediction decision and for overcoming incorrect measurements by an ACC sensor (e.g., radar, video, or LIDAR sensors).

SUMMARY

In one embodiment, the invention provides an adaptive cruise control (ACC) system for a vehicle. The ACC includes a vehicle speed sensor, a user interface, a steering angle sensor, a forward facing sensor, and an engine control unit (ECU). The vehicle speed sensor is configured to detect a speed of the vehicle and output an indication of the detected speed. The steering angle sensor is configured to provide an indication of the direction a driver is steering the vehicle. The forward facing sensor is configured to detect objects in front of the vehicle and to provide an indication of the objects. The ECU includes an adaptive cruise control (ACC) and is configured to receive the indications from the sensors, and to determine whether to continue following a target vehicle or to release the target vehicle and accelerate the vehicle to a cruising speed.

In another embodiment, the invention provides a method of operating an adaptive cruise control (ACC) system of a vehicle. The method includes the ACC determining a predicted course for the vehicle, detecting a target vehicle in the predicted course of the vehicle, adjusting the speed of the vehicle to maintain a distance between the vehicle and the target vehicle, determining that the target vehicle is diverting from the predicted course, receiving an indication of a steering angle from a steering angle sensor, determining whether to release the target vehicle, and accelerating the vehicle to a previously set cruising speed when the ACC determines to release the target vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In some embodiments, an ACC adapts a jerk (rate of change of acceleration) if a turn-off of a target vehicle has explicitly been detected, such that the jerk to let go of the braking is higher than usual.

The jerk limitation is what gives adaptive cruise control the 'comfort' feeling. Larger jerks are a harsher reaction than smaller ones. Smaller jerks can sometimes be interpreted as slow reactions to a given situation. The jerk limitation is the rate of change of acceleration. Therefore, the jerk limitation defines the time to get from a given acceleration to a different target acceleration.

In some embodiments, the detection of a turn-off is accomplished by detecting a rapid movement of a lateral offset with respect to a course prediction from near a center of the course prediction to an outer edge. Upon determining the target vehicle has moved to the outer edge, the target vehicle is no longer considered a target object. The side at which the vehicle exits the course prediction is used to determine which side the turn-off occurred.

One possible way to determine the difference between a turn-off and following someone around a corner is to determine if the driver is steering in the direction of the turn-off, not turning at all, or turning in an opposite direction. If the driver is steering in the direction of the turn-off, then the driver is likely following the object. The magnitude of the steering does not need to be large. The difference of 'nudging away' or 'nudging toward' the target object can be learned by the driver, so that an experienced ACC user can control the ACC reaction a by giving a small steering input.

As an alternative to a 'yes/no' selection of the let-go jerk, the magnitude of the steering wish or input can be used to produce a continuous value between a minimum and maximum jerk reaction. Thus, a 'no reaction' would create a let-go jerk that is somewhere between the minimum and maximum possible let-go jerk values.

If numerous different sensors are available, the let-go jerk can be dependent on whether the turn-off is confirmed by multiple sensors. The faster let go is done only in cases where there is a high degree of certainty that a turn-off of the target object has actually occurred.

The steering intention is measured using signals from the steering wheel, such as a steering wheel angle, a steering wheel velocity, a vehicle yaw rate, or course-predictions based on one or more of these signals.

Figure 1:
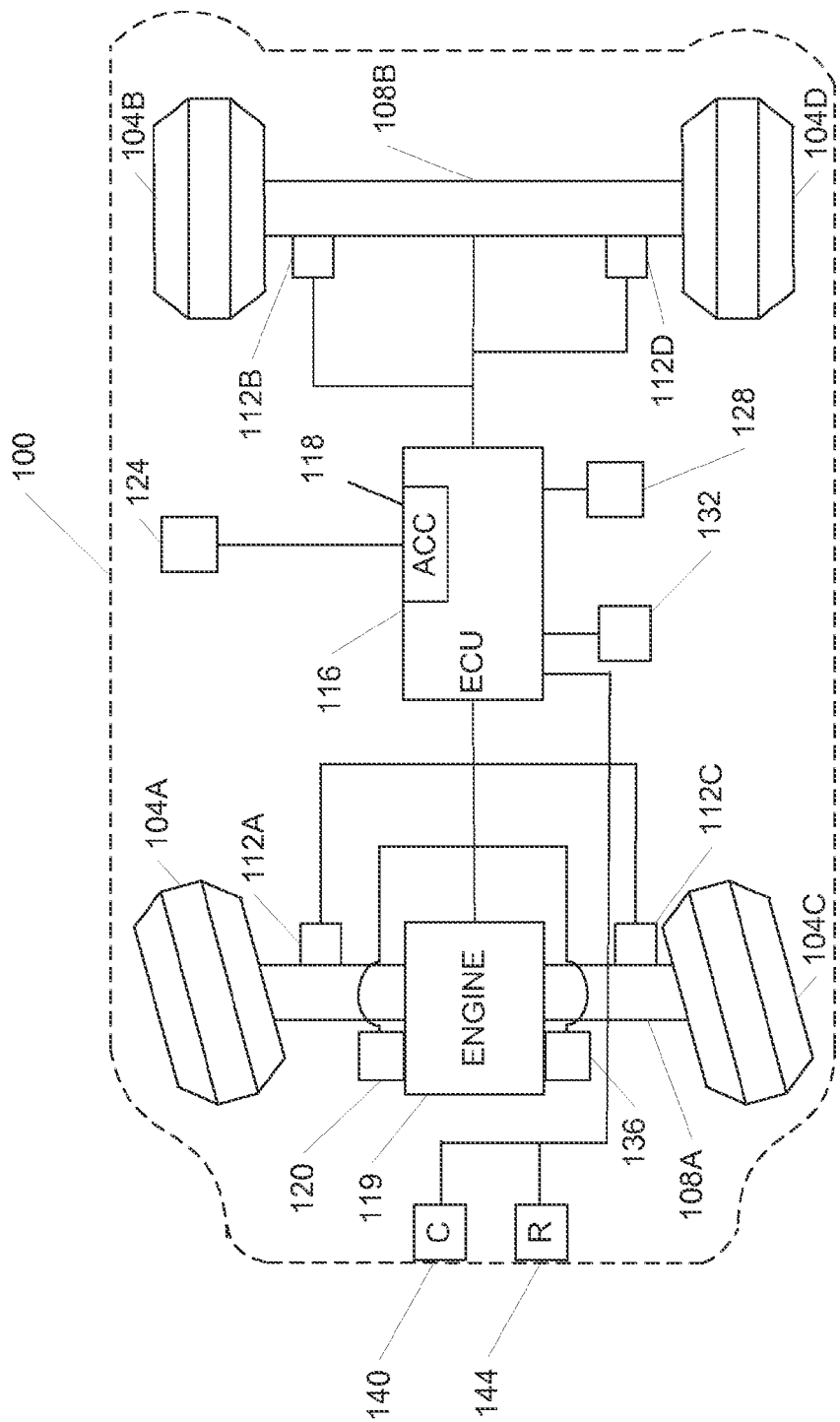
FIG. 1 is a schematic diagram of a vehicle.

FIG. 1 shows a schematic view of a vehicle 100. The vehicle 100 has four wheels 104A, 104B, 104C, and 104D. In some other embodiments, the vehicle 100 can have a different number of wheels. The wheels 104A, 104B, 104C, and 104D are connected to two axles 108A and 108B, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116 which includes an ACC 118 coupled to an ACC user interface 124. The vehicle 100 also includes other sensors such as a steering angle sensor 120, an engine torque sensor 136, a longitudinal acceleration sensor 128, a body slip angle sensor 132, an engine torque sensor 136, a forward facing camera 140, and one or more object detection devices (e.g., radars) 144. The wheel speed sensors 112A, 112B, 112C, and 112D, the steering sensor 120, the longitudinal acceleration sensor 128, and the lateral acceleration sensor array 128 are shown as individual sensors generically. These sensors 112A, 112B, 112C, 112D, 120, and 128 can also include multiple sensors in a plurality of sensor arrays, for example, that may be coupled to the ECU 116.

Sensors such as the wheel speed sensors 112A, 112B, 112C, and 112D detect and monitor a condition of each of the wheels 104A, 104B, 104C, and 104D that is indicative of an amount of velocity experienced by the vehicle 100. Sensors such as the steering angle sensor 120, the roll sensor array 138, and the torque sensor 136 are configured to detect a plurality of conditions of the vehicle 100.

It should also be noted that the sensed values can come directly or indirectly from the sensors. The sensed values can be sent or delivered to the ECU 116 via other vehicle systems. These other vehicle systems can include, but are not limited to, an antilock braking controller, an electronic stability controller, a restraint electronics controller, and the like. It should also be noted that the sensed values can also be configured to be available at the ECU 116 using direct electrical connections from the sensors such as the lateral acceleration sensor array 128 and the roll sensor array 138, direct electrical connections to other vehicle systems, or via a vehicle communication bus (e.g., a CAN bus), in a known manner.

Figure 2:
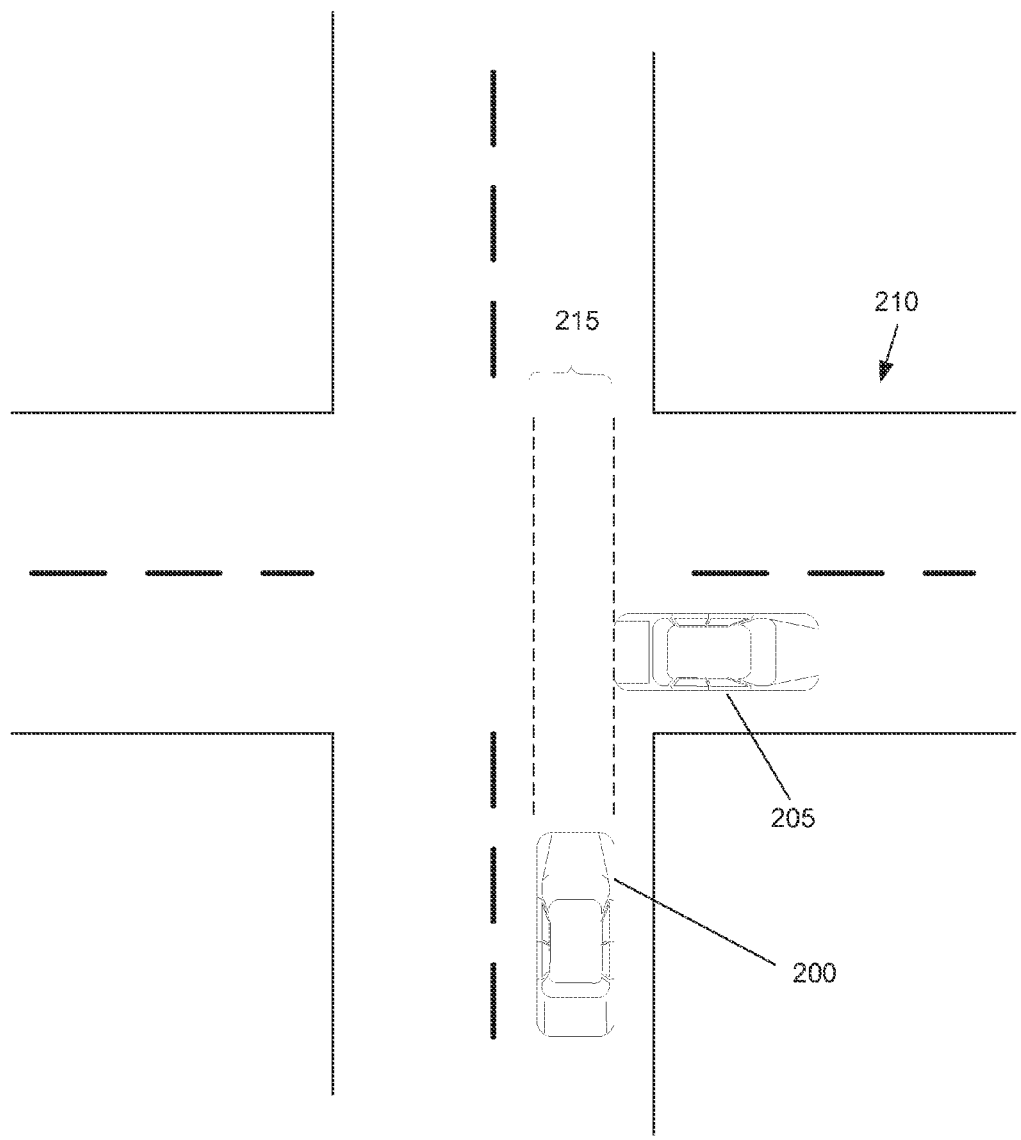
FIG. 2 is a diagram of a target vehicle making a turn.

FIG. 2 shows a diagram of a vehicle 200 following a target vehicle 205. The target vehicle 205 has turned onto a side street 210. As the target vehicle 205 was turning, the target vehicle 205 likely was slowing down. The ACC of vehicle 200 slows the vehicle 200 down to maintain a distance behind the target vehicle 205. The ACC determines that the target vehicle 205 is turning when the target vehicle 205 leaves a predicted course 215. Once the ACC determines that the target vehicle 205 is turning, and that the target vehicle 205 has moved out of a collision zone (e.g., a zone where the vehicle 200 could contact the target vehicle 205 if the vehicle 200 maintains the predicted course 215), the ACC returns the vehicle to a cruising speed previously set by the driver (via the user interface 124). The transition from slowing (i.e., braking) to accelerating is the jerk. The rate at which the deceleration to acceleration is accomplished determines the magnitude of the jerk.

When the driver determines that the target vehicle 205 is turning, the driver can indicate that the driver does not want to continue following the target vehicle 205 by turning the steering wheel in a direction away from the direction the target vehicle 205 is turning. The ACC can recognize this indication and begin returning to the cruising speed sooner (e.g., with the driver steering around the target vehicle 205). The amount the driver turns the steering wheel need only be a very slight amount (e.g., bumping the steering wheel in a direction away from the direction the target vehicle is moving).

Figure 3:
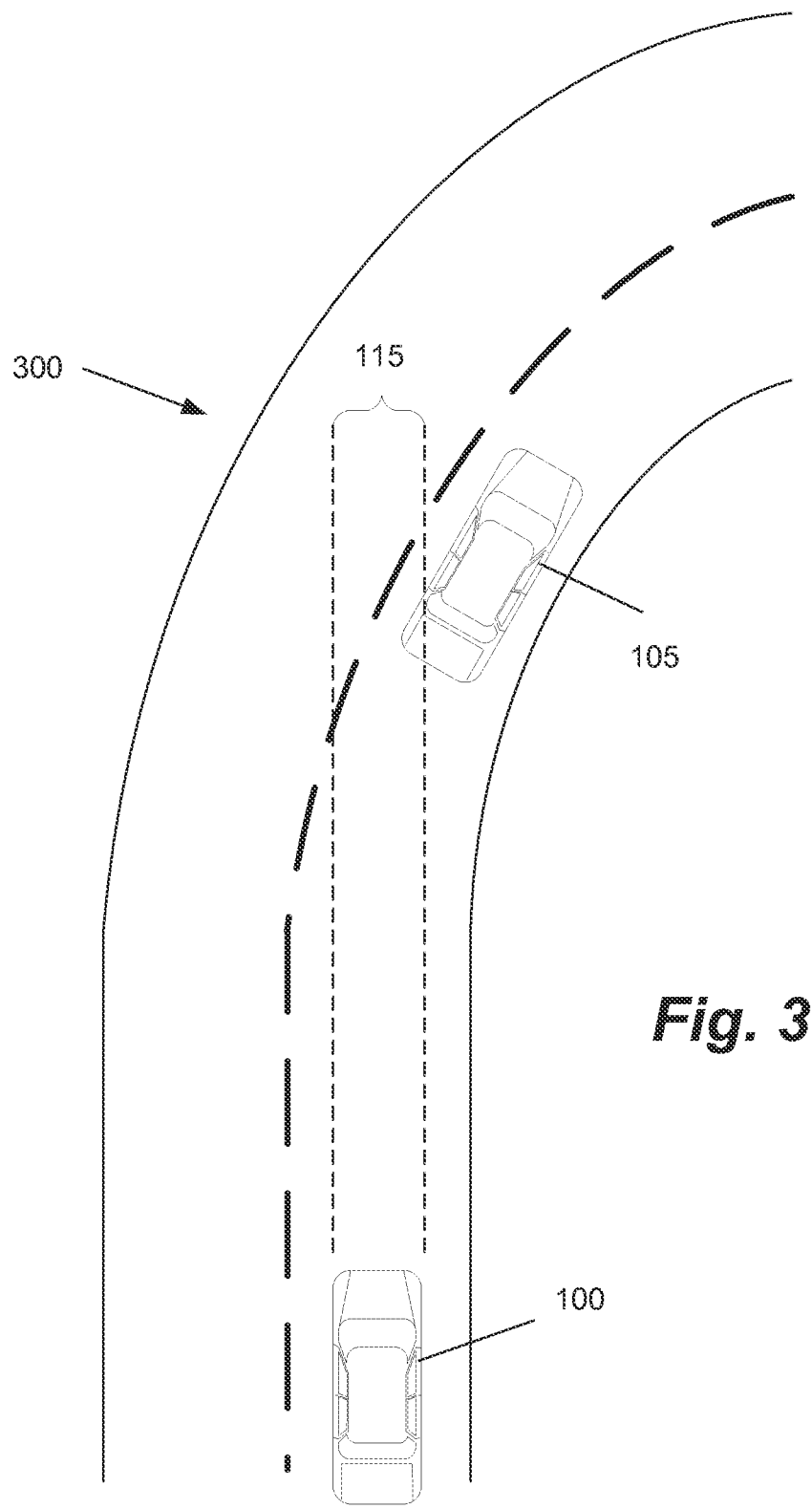
FIG. 3 is a diagram of a vehicle and a target vehicle traversing a curve.

FIG. 3 shows a diagram of the vehicle 200 and the target vehicle 205 traveling around a curve 300 in the road. In this instance, the ACC may determine that the target vehicle 205 is turning, releasing the target vehicle 205, and maintaining the cruising speed. The driver can indicate to the ACC that the driver wishes to continue following the target vehicle 205 by turning the steering wheel slightly to the right (e.g., not enough to steer the vehicle 200 to the right, but enough to provide an indication to the ACC of the driver's intentions). In some embodiments, the ACC detects the curvature of the road (e.g., via a camera detecting lane lines) and maintains following of the target vehicle without driver intervention.

Figure 4:
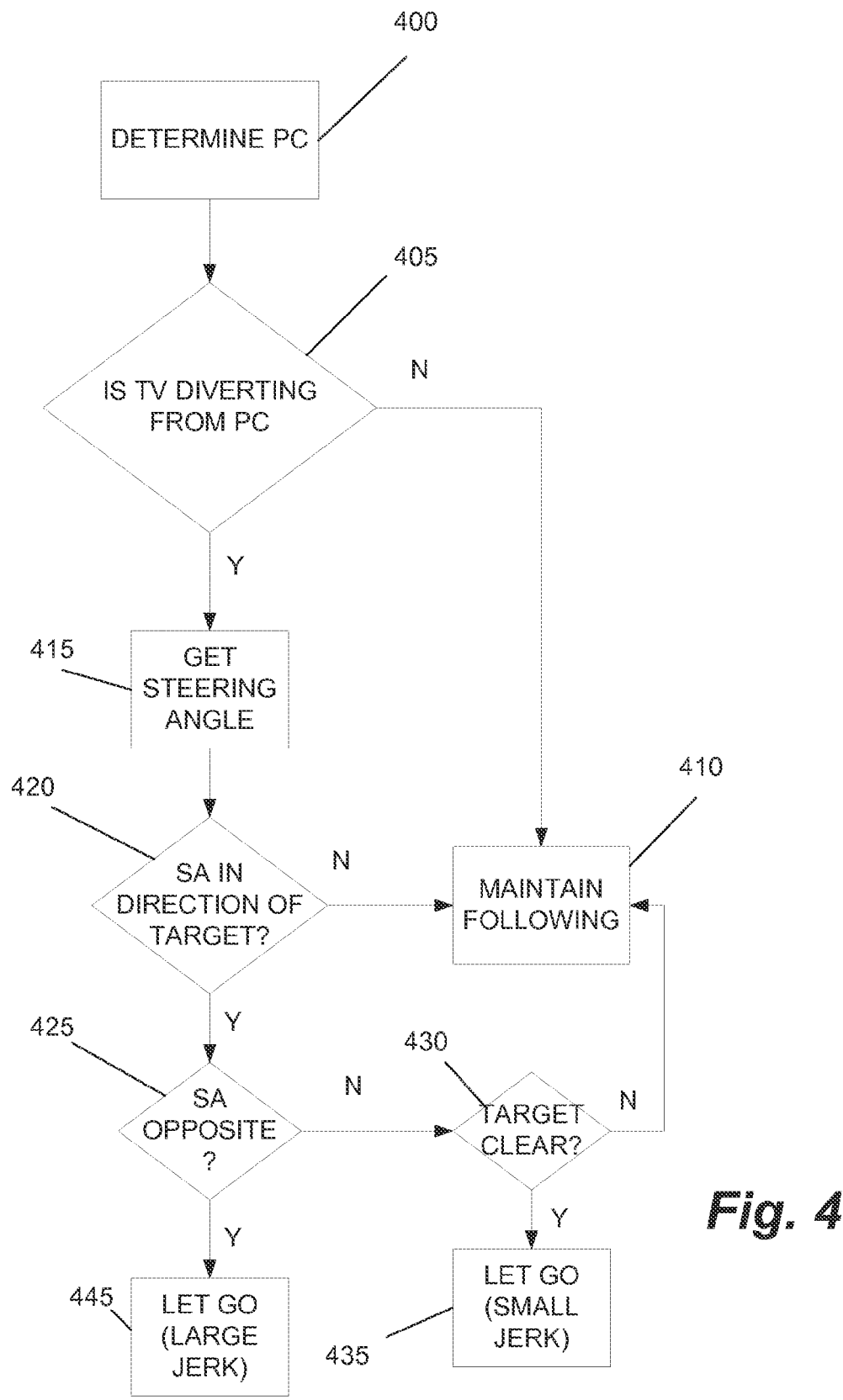
FIG. 4 is a flow chart of an operation of an ACC.

FIG. 4 is a flow chart of an embodiment of the ACC system. The ACC determines a predicted course (PC) for the host vehicle (step 400), and determines if a target vehicle (TV) is diverting from the predicted course (step 405). The target vehicle could be diverting from the predicted course because the target vehicle is following a curve in the road (see FIG. 3) or the target vehicle could be turning off. If the target vehicle is not diverting from the predicted course, the ACC continues to follow the target vehicle (step 410). If the target vehicle is diverting, the ACC reads the steering angle from the steering wheel (step 415). If the steering angle is in the direction the target vehicle is moving (step 420), the ACC continues to follow the target vehicle (step 410). If the steering angle is not in the direction the target vehicle is moving, the ACC determines if the steering angle is in the direction opposite of the direction of the target vehicle is moving (step 425). If the steering angle is not opposite the direction of the target vehicle, the ACC checks if the target vehicle is clear (e.g., far enough out of the predicted course of the vehicle to avoid a collision) (step 430). If the target vehicle is clear, the ACC lets go of the braking of the vehicle with a relatively small jerk (step 435). If the target vehicle is not clear, the ACC continues following the target vehicle maintaining the distance to the target vehicle (step 410).

If the steering angle is opposite the direction of the target vehicle at step 425, the steering angle is away from the direction the target vehicle is heading, indicating that the driver does not want to continue following the target vehicle and will steer around the target vehicle. The ACC then lets go of the target vehicle and accelerates to the cruising speed (a relatively large jerk) (step 445).

Thus, the invention provides, among other things, an ACC system which reacts to target vehicles that are turning.

What is claimed is:
1. An adaptive cruise control (ACC) system for a vehicle, the ACC comprising:
a vehicle speed sensor configured to detect a speed of the vehicle and output an indication of the detected speed;
a user interface;
a steering angle sensor configured to provide an indication of the direction a driver is steering the vehicle;
a forward facing sensor configured to detect objects in front of the vehicle and to provide an indication of the objects; and
an engine control unit (ECU) including an adaptive cruise control (ACC) and configured to
receive an indication from the user interface to set a cruising speed for the vehicle,
receive the indication of the vehicle's speed from the speed sensor,
receive indications of detected objects from the forward facing sensor, to receive indications of the steering angle from the steering angle sensor,
determine whether to continue following a target vehicle based on the steering angle, and a projected path of the vehicle, and accelerate the vehicle to the cruising speed when the ECU determines not to continue following the target vehicle, wherein determining whether to continue following a target vehicle based on the steering angle includes determining when the driver bumps a steering wheel in a direction opposite of the target vehicle.

2. The method of claim 1, wherein the ACC determines to continue following the target vehicle when the steering angle received is in a same direction as the target vehicle is moving.

3. The method of claim 1, further comprising determining, by the ACC, to release the target vehicle when the steering angle received indicates a straight direction for the vehicle.

4. The method of claim 3, determining whether the target vehicle is clear of the predicted course of the vehicle, maintaining the distance between the vehicle and the target vehicle when the target vehicle is not clear, and accelerating to the cruising speed when the target vehicle is clear.

5. The method of claim 1, wherein the ACC determines to release the target vehicle when the steering angle received is in a direction opposite that in which the target vehicle is moving.

6. The method of claim 5, wherein the ACC accelerates the vehicle to the cruising speed.

7. A method of operating an adaptive cruise control (ACC) system of a vehicle, the method comprising:

determining, by the ACC, a predicted course for the vehicle;

detecting, by the ACC, a target vehicle in the predicted course of the vehicle;

adjusting the speed of the vehicle to maintain a distance between the vehicle and the target vehicle;

determining, by the ACC, that the target vehicle is diverting from the predicted course;

receiving an indication of a steering angle from a steering angle sensor;

determining whether to release the target vehicle based on the steering angle and a projected path of the vehicle;

accelerating the vehicle, by the ACC, to a previously set cruising speed when the ACC determines to release the target vehicle, and wherein determining whether to release the target vehicle based on the steering angle includes determining when the driver bumps a steering wheel in a direction opposite of the target vehicle.

8. The method of claim 7, wherein the ACC determines to not release the target vehicle when the steering angle received is in a same direction as the target vehicle is moving.

9. The method of claim 7, further comprising when the steering angle received indicates a straight direction for the vehicle, determining, by the ACC, to release the target vehicle.

10. The method of claim 9, determining whether the target vehicle is clear of the predicted course of the vehicle, maintaining the distance between the vehicle and the target vehicle when the target vehicle is not clear, and accelerating to the cruising speed when the target vehicle is clear.

11. The method of claim 7, wherein the ACC determines to release the target vehicle when the steering angle received is in a direction opposite that in which the target vehicle is moving.

12. The method of claim 11, wherein the ACC accelerates the vehicle to the cruising speed.

* * * * *